US004001619B2

United States Statutory Invention Registration [19]

[11] Reg. Number: H1619

[45] Published: Dec. 3, 1996

McCord et al.

[54] FREQUENCY-MODULATED MONITOR HYDROPHONE SYSTEM

[75] Inventors: Michael T. McCord; Larry E. Ivey, both of Orlando, Fla.

[73] Assignee: United States of America, Washington, D.C.

[21] Appl. No.: 431,165

[22] Filed: Apr. 21, 1995

[51] Int. Cl.[6] ..... H04B 17/00

[52] U.S. Cl. ..... 367/13

[58] Field of Search ..... 367/13

*Primary Examiner*—Daniel T. Pihulic

*Attorney, Agent, or Firm*—Thomas E. McDonnell; Charles J. Stockstill

[57] ABSTRACT

The frequency modulated monitor hydrophone system which is used to monitor low frequency sound signals where cross-talk coupling is a problem, consisting of a hydrophone, preamplifier and receiver which includes a control group. The hydrophone comprises an acoustic sensor and low-noise preamplifier utilizing dynamic range compression to condition the electrical acoustic sensor signal before it is frequency modulated (FM) and applied to a coaxial cable. At the remotely located receiver, the FM signal from the hydrophone preamplifier is filtered to remove undesirable signals, such as audio spectrum crosstalk and out of band signals. The partially recovered audio signal is decompressed utilizing dynamic range decompression, amplified, and output for utilization or recordation by an operator. A calibration circuit provides a continuity or partial calibration check for the hydrophone by applying a signal of predetermined frequency and voltage to the hydrophone preamplifier and sensor. A microprocessor in the control group periodically reads the input signal and controls the various receiver and hydrophone preamplifier circuits. Selected controls on the panel of the control group allows the operator to set gains, perform the calibration procedures, and monitor system performance.

6 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FREQUENCY-MODULATED MONITOR HYDROPHONE SYSTEM

BACKGROUND OF THE INVENTION

1. Field of the Invention

This invention pertains generally to a hydrophone system and in particular to a frequency modulated monitor hydrophone system.

2. Description of Related Art

Currently, the hydrophone systems are supplied to users are not of a standard technical quality and suffer from the effects of crosstalk and other extraneous noises introduced into the signal from the hydrophone through long runs of four-wire cabling. Such existing systems are limited to a frequency range of less than 10 kHz and have a limited gain.

SUMMARY OF THE INVENTION

The object of the invention is to provide a hydrophone system that can be used to measure acoustic signals at remote locations up to 6000 meters away and that is capable of reproducing the sound fields without contamination by cable-related crosstalk or attenuation.

This objective is achieved by the frequency modulated monitor hydrophone system which is comprised of a hydrophone containing an acoustic sensor and preamplifier, a means for calibrating the hydrophone sensor, preamplifier and receiver. The hydrophone preamplifier is a low-noise preamplifier which utilizes dynamic range compression to condition the electrical acoustic sensor signal before it is frequency modulated (FM) and applied to a coaxial cable. At the receiver, located at a remote location, the FM signal is filtered to remove undesirable signals, such as audio spectrum crosstalk and out of band signals. The partially recovered audio signal is decompressed and configured to a desired gain and the resulting fully recovered audio signal is output for utilization or recordation by an operator. A microprocessor in the control group periodically reads the input signal and controls the various receiver and hydrophone preamplifier circuits.

DESCRIPTION OF THE PREFERRED EMBODIMENT

Figure 1:
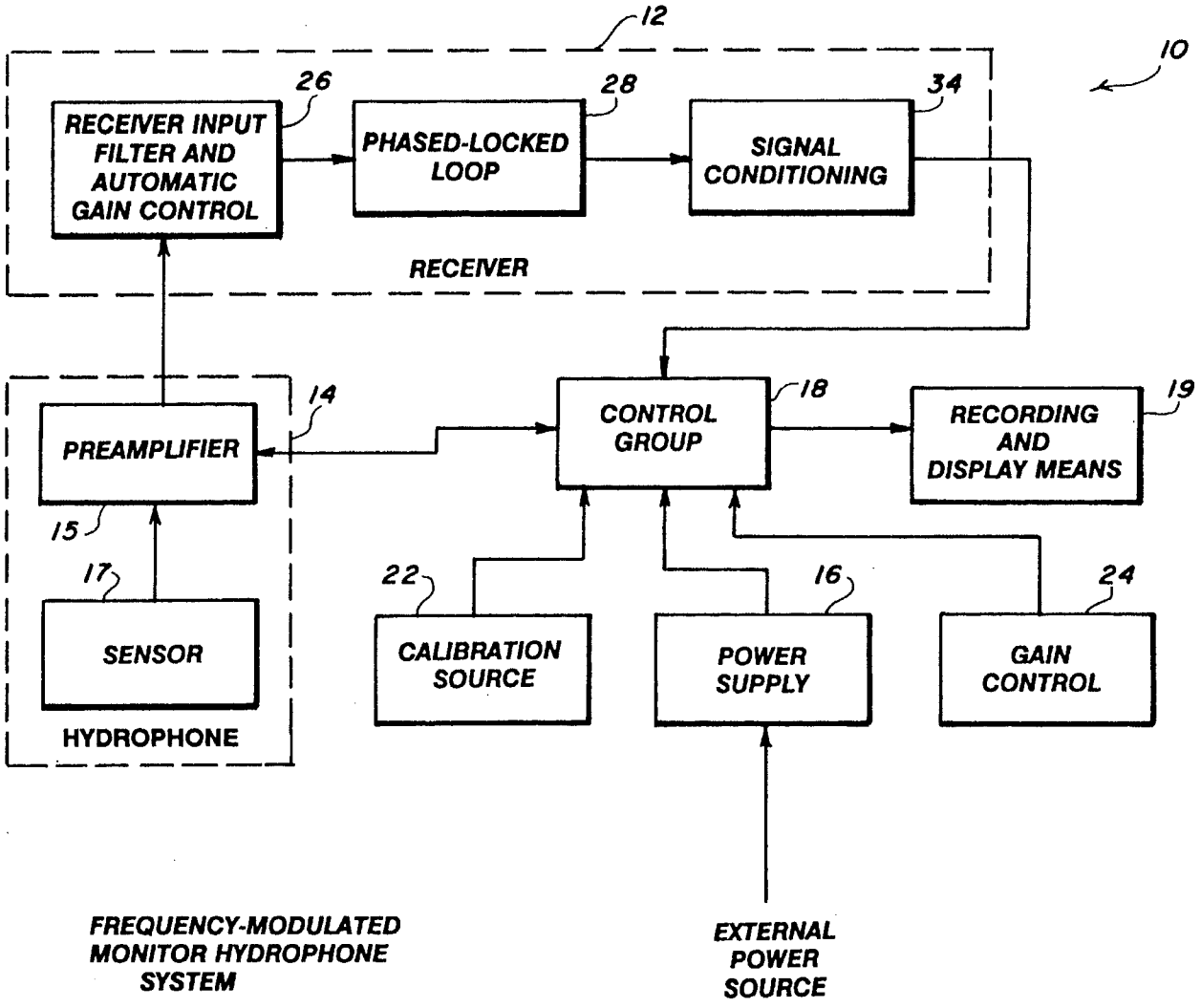
FIG. 1 is a block diagram of a frequency-modulated monitor hydrophone system.

The frequency-modulated monitor hydrophone system 10, as shown in FIG. 1, is comprised of a receiver 12 and hydrophone assembly 14. The receiver 12 is further comprised of a power supply 16, control group, or unit, 18 with a calibration current source 22, gain control 24, receiver input filter and automatic gain control circuit 26, phase-locked loop circuit 28, and signal conditioning circuit 34. The hydrophone 14 is further comprised of a hydrophone preamplifier 15 and a sensor 17.

An interconnecting coaxial cable 13, terminated in a 50 Ω load, between the receiver 12 and hydrophone 14 may be of any commercial design that is capable of transmitting the system power requirements and processed electrical signals from the sensor 17. The preferred cable 13 is a standard metallic conductor coaxial cable, however, the length is generally limited to 6000 meters. A fiber optic cabling may be utilized with the appropriate termination devices, thus permitting communications over distances in excess of 6,000 meters.

The sensor 17 may be of any design known to the art that is capable of sensing changes in hydrostatic pressures and converting such changes into an electrical signal.

The power supply 16 receives an input power of 115±10 volts rms 60 cycle alternating current (ac) from an external source (not shown), however, this power may be of any other voltage or frequency with the adaptation of the internal power conversion elements to accommodate this variance in input power. The output of the power supply is ±6 vdc and 48 vdc. The design of the power supply is well known to the art.

Figure 2:
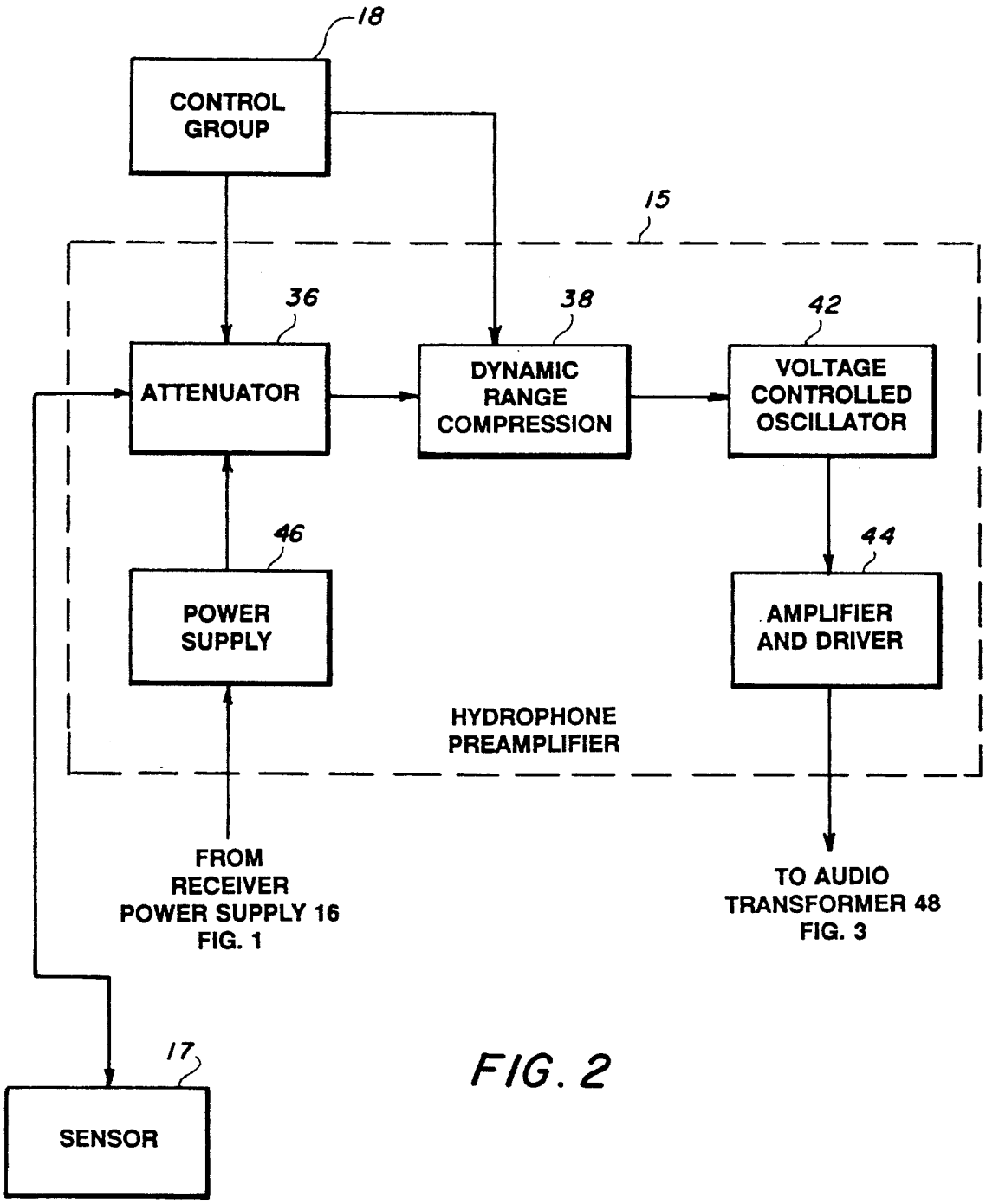
FIG. 2 is a block diagram of a hydrophone preamplifier.

Referring to FIG. 2, the hydrophone preamplifier 15 is comprised of an attenuator 36, dynamic range compression 38, voltage controlled oscillator 42, amplifier and driver 44, and a power supply 46. The hydrophone preamplifier 15 is located in the hydrophone 14 along with the sensor 17.

Acoustical input signals are converted to electrical signals in the sensor 17 and applied to the attenuator 36 in the hydrophone preamplifier 15 where gains of +20, 0, or −20 dB may be remotely selected by the operator through the actuation of a switch (not shown) on the front panel of the control group 18. The selected output signal of the attenuator 36 is then applied to a dynamic range compression (DRC) circuit 38 where it is conditioned and applied to the voltage controlled oscillator 42 for conversion to a frequency modulated (FM) signal whose current is boosted for transmission through the coaxial cable (not shown) by the amplifier and driver section 44.

The hydrophone preamplifier 15 has two modes, first is a sensing mode and the second is a system calibration mode. In the sensing mode, the electrical signal from the sensor 17 is input to the attenuator 36 at a voltage ranging from 3 uv to 30 Vrms and having a frequency range from 10 Hz to 20 kHz. The attenuator 36 provides, selectively, a ±20 dB or 0 dB as discussed above. After the gain of the electrical signal from the sensor 17 has been adjusted by the attenuator 36 it is applied to the dynamic range compression (DRC) circuit 38 where the gain is varied.

DRC is selected by the sensing of the polarity of the applied dc current in the electrical signal. The DRC 38 is configured to reduce 120 dB dynamic range to 60 dB or it may be configured to operate at a fixed gain with 60 dB dynamic range. Only one range selection at a time may be selected. The DRC 38 is turned on or off by a signal from the control unit 18, so as to provide a selectable gain. In the DRC 38, weak or strong signals are amplified in voltage to provide a wide dynamic range. A wide range of signals, some on the order of 140 dB, are being input from the sensor 17, the DRC 38 compresses that range so that small signals are amplified differently from large signals. As a result of the DRC 38, the FM signal being output from the hydrophone preamplifier 15 may be distorted, however, this is of no concern because the dynamic range decompression (DRD)

in the receiver (not shown) will recover the original signal. When the DRC 38 is in the "on" condition, the gain will vary, depending upon the input signal, between −14.7 and +35.3 dB through the interaction of a variable gain control (not shown). In the DRC "off" condition, the gain is set at −14.7 dB. DRC 38 is controlled by the polarity of the input signal, whereas, in the receiver (not shown), the DRC is controlled by the microprocessor (not shown) in the control group 18. In the DRC 38, the selected polarity activates the selected DRC "on" or DRC "off" condition. The compressed voltage signal is then applied to the FM modulator (voltage controlled oscillator) 42.

The voltage controlled oscillator (VCO) 42 provides a frequency modulated voltage signal output to the amplifier and driver 44. In the amplifier and driver 44, the FM signal is amplified to provide more current drive and applied to the receiver (not shown) through the coaxial cable (not shown).

Power to the hydrophone preamplifier 15 is derived from a dc current conducted through the coaxial cable (not shown) from the receiver (not shown). The ac signals are filtered upon entering the preamplifier 15, thereby removing coupled crosstalk and modulated carrier signals. In a calibration mode, a current generated by the calibration source in the receiver (not shown) is applied to the hydrophone preamplifier 15 to check the continuity of the hydrophone system 10. Inside of the hydrophone preamplifier 15 the calibration current develops a voltage that is applied to the sensor 17 and into the hydrophone preamplifier 15 and returned to the control group 18 through the coaxial cable (not shown). This effectively provides the operator with a complete loop-back system check.

The preamplifier power supply 46 produces the three voltages required to operate the hydrophone preamplifier 15. A 24 vdc power from the receiver (not shown) is adjusted so as to set the voltage to the hydrophone preamplifier 15 at 15 vdc and dissipate a current of 5–15 ma in excess of the 25–35 ma required to operate the preamplifier 15. The output of the preamplifier power supply 46 is regulated so as to set the hydrophone preamplifier 15 voltage at 12 vdc. Incremental current changes will result in incremental gain changes. The dc current input to the hydrophone preamplifier 15 is controlled by the operator through a switch circuit (not shown) on the control unit 18 which allows for incremental drops in resistance resulting in 5 mA incremental increases in current. The actual configuration of the current output is shown as a panel indicator (not shown) on the control unit 18. Through this process an output current of 40, 45, or 50 mA dc is provided to the hydrophone preamplifier 15.

Figure 3:
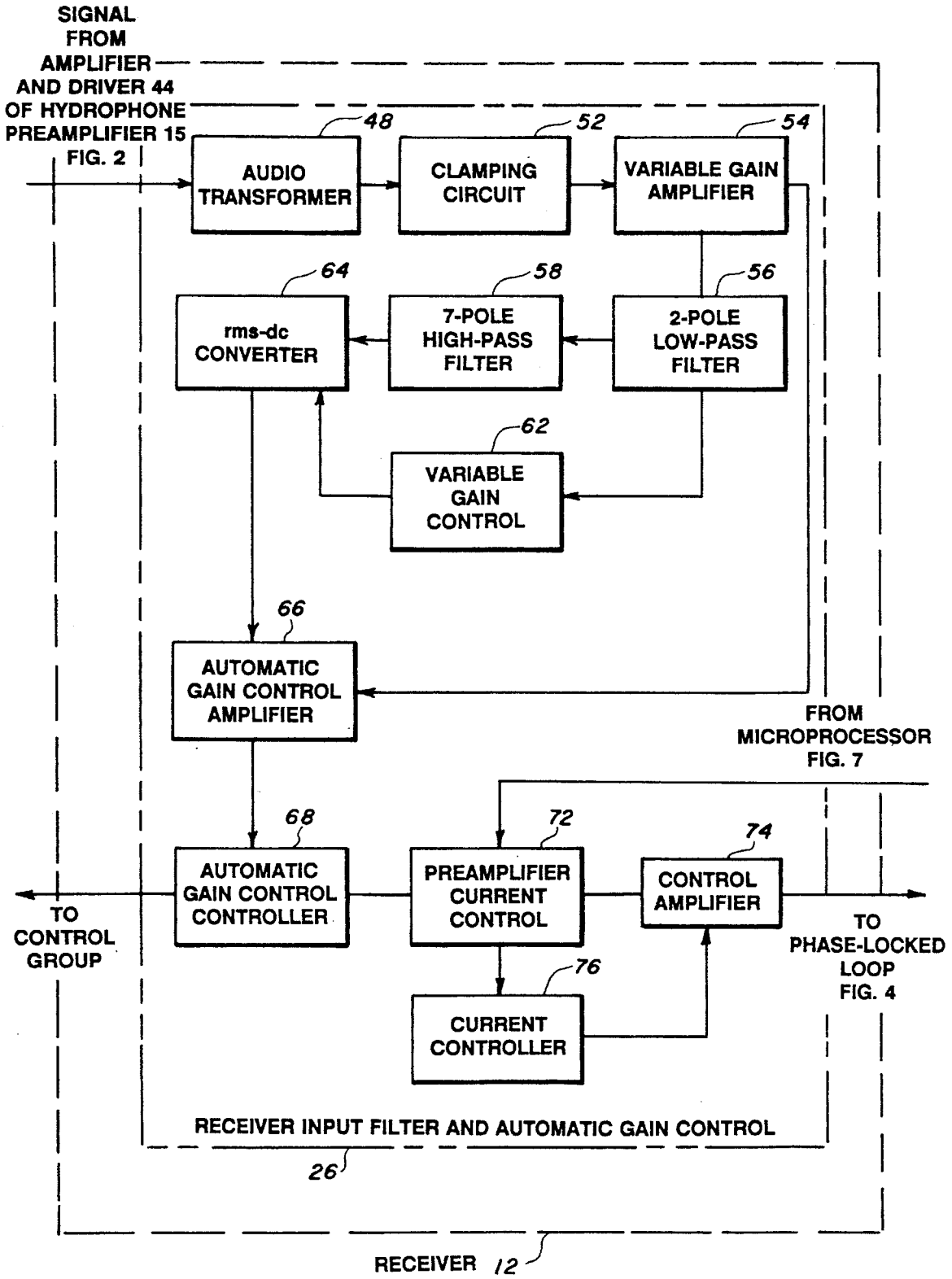
FIG. 3 is a block diagram of a receiver input and automatic gain control for a hydrophone receiver.

Referring to FIG. 3, the received FM signals from the hydrophone preamplifier 15 that are processed by the receiver 12 include a modulated carrier (5 mV to 1.15 Vrms) and any crosstalk that may have been induced into the coaxial cable (not shown). Undesirable common-mode signals, such as 60 cycle line noise, are attenuated by an input transformer (not shown), other undesirable signals, such as audio spectrum crosstalk, are attenuated by filters (not shown).

The receiver input filter 26 receives the FM signal from the hydrophone preamplifier 15 and acts as a band-pass filter filtering out frequencies above and below the carrier signal of the input FM signal. The FM output signal of the receiver input filter 26 is applied to an automatic gain control (AGC) amplifier 66 where the FM carrier is amplified or attenuated so that the FM output is always 0.5 Vrms. An on-line indicator light (not shown) on the control group (not shown) illuminates when the AGC level indicates a signal level greater than 5 mVrms. The indicator light (not shown) is enabled by a control line from a microprocessor (not shown) in the control unit (not shown). Although this FM carrier may be any desired frequency high enough to provide a usable audio bandwidth, the preferred frequency in this embodiment is a sine wave FM signal of 225±5 kHz having an amplitude of 0.005 to 1.0 Vrms and all circuits are designed utilizing this frequency. If any other desired FM carrier frequencies are utilized, then the values of the circuit components must be varied to meet the requirements of that frequency. It is noted, however, that if higher FM carrier frequencies than 225 kHz are utilized the attenuation in any connecting coaxial cable (not shown) will be increased.

The FM signal voltage from the hydrophone (not shown), nominally between 5 mVrms and 1 Vrms, is applied to an audio transformer 48 which is designed to step-up the voltage of the input signal by a factor of 1.58. The stepped-up signal voltage is then applied, through a clamping circuit 52, to a variable gain amplifier 54. The design of the clamping circuit 52 is well known to the art and protects following components from any transient voltages that exceed the tolerances of such components.

The variable gain amplifier 54, is an operational amplifier (op-amp) that forms a closed loop with and is controlled by the automatic gain control 68, discussed below. The variable gain amplifier 54 stabilizes the input signal voltage from the hydrophone (not shown) at 0.5 Vrms in this embodiment. The stabilized input signal voltage is then applied to a 2-pole low-pass filter 56 and 7-pole high-pass filter 58.

The 2-pole low-pass filter 56 passes signals below 386 kHz, to remove high frequency noise and any spurious radiations. The output of the low-pass filter 56 is applied to the 7-pole high-pass filter 58 tuned to pass those signals above 67 kHz so as to eliminate crosstalk, and, thereafter to a variable gain amplifier 62 which compensates for any drops in signal due to filtration. After filtration and amplitude compensation, the signal, containing frequencies between 67 and 386 kHz, is output to a rms-dc converter 64.

The rms-dc converter 64 senses the amplified rms voltage output of the high-pass filter 58 and generates an equivalent direct current (dc) voltage which is applied to an automatic gain control (AGC) amplifier 66 acting as an op-amp comparator. The 0.5 v dc voltage from the variable gain amplifier 54 is compared to the input from the rms-dc converter 64, and the output of the AGC amplifier 66, an AGC voltage, is applied to the automatic gain control controller 68.

The AGC loop is controlled by the AGC controller 68 which is essentially a comparator. When the AGC level applied is above a predetermined level, 0.62 Vdc in this embodiment, the output goes negative, and vise-versa. When the output goes negative a panel light on the control group (not shown) is illuminated to indicate that the AGC circuit is tracking or that you have a usable FM signal provided by the hydrophone (not shown).

A preamplifier current control 72 generates the dc current and determines the polarity and level of the current to be applied to the hydrophone preamplifier (not shown). To prevent damage to components as the result of rapid changes of dc current to the hydrophone preamplifier (not shown), the preamplifier current control 72 generates a current ramp that allows the current to gradually rise, thereby not overloading the hydrophone preamplifier (not shown) circuit. A 5 vdc signal from a microprocessor (not shown) in the control unit (not shown) is applied to the preamplifier current control 72, if the applied voltage is a positive 5 vdc the voltage is inverted to –6 vdc, and if the voltage is zero it is inverted to +6 vdc.

Current control begins as a digital level from the microprocessor (not shown) in the control unit (not shown) and is represented as on or off. The preamplifier current control 72 converts the step function to a ramp function. The preamplifier current is then forced to follow the ramp using a feedback control circuit. This circuit works by comparing the output current with the ramp voltage and adjusting the current. Therefore, the moderate rate of current change will prevent the development of dangerous transient voltages. Polarity of the output current is selected by the microprocessor (not shown). Either of two levels are produced, +6 vdc or –3.2 vdc. In between these two voltage levels, the voltage ramps and is output to a control loop 88 which controls the current loop. A second voltage representing output current to the preamplifier 15 is applied to the control amplifier 74 after being processed in the current controller 76.

In the current controller 76, a voltage representing the output current to the preamplifier (not shown) is applied to the control amplifier 74 where it is stabilized. The control amplifier 74 tracks the ramping process and stop ramping at a predetermined value, nominally –3.2 vdc, at which point current to the preamplifier is minimized (near zero).

Figure 4:
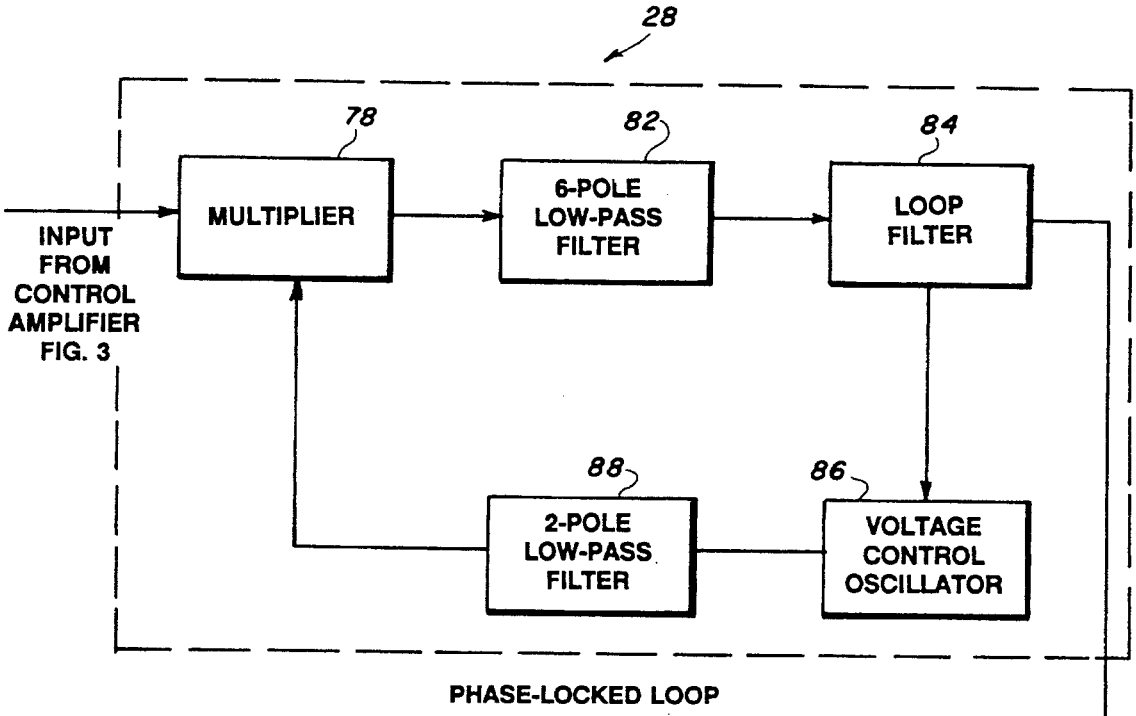
FIG. 4 is a block diagram of a phase-locked loop of the hydrophone receiver.

Once filtered and stabilized, the FM signal is demodulated by the phase-locked loop 28, as shown in FIG. 4. The phase-locked loop 28, is comprised of a multiplier integrated circuit 78, a 6-pole low-pass filter circuit 82, a loop filter (second order) 84, voltage controlled oscillator (VCO) 86, and a 2-pole low pass filter circuit 88. Phase comparison is performed by a multiplier 78 which receives two input signals: (1) the conditioned FM signal from the control amplifier (not shown) and (2) a voltage controlled oscillator (VCO) 86.

The multiplier 78 is the heart of the phase-locked loop module 28 and serves as a phase comparator and receives an FM input from the control amplifier 74 in FIG. 3 and an output from the VCO 86. The multiplier 78 outputs: the sum, the difference of the FM and VCO frequency inputs and the original FM and VCU frequencies which are applied to the 6-pole low-pass filter 82. In the 6-pole low-pass filter 82, the unwanted high frequency components of the signal are removed while amplifying the audio component; the original FM frequency and the sum of the FM and VCO frequencies are filtered out, keeping the difference between the FM and VCO frequencies which becomes the audio frequency that drives the VCO circuit 86 which is applied, first, to the loop filter (second order) 88 which has a gain on the order of one or two, and tunes the output frequency. Also the audio gain is adjusted to a predetermined factor to compensate for variance in tolerances in the components utilized in the phase-locked loop module 28. The adjusted frequency becomes the center frequency of the signal applied to the VCO 86. The signal applied to the VCO 86 from the loop filter 84 is representative of the modulation on the FM signal at the multiplier 78, except that it is now 90 degrees out of phase. The output of the VCO 86 is converted from a triangle wave to a sine wave and applied to the multiplier 78 through the filter 88. The output of the loop filter 84 is also applied to the signal conditioning module 34, also called dynamic range compression (DRC) or audio processor (shown in FIG. 5).

Figure 5:
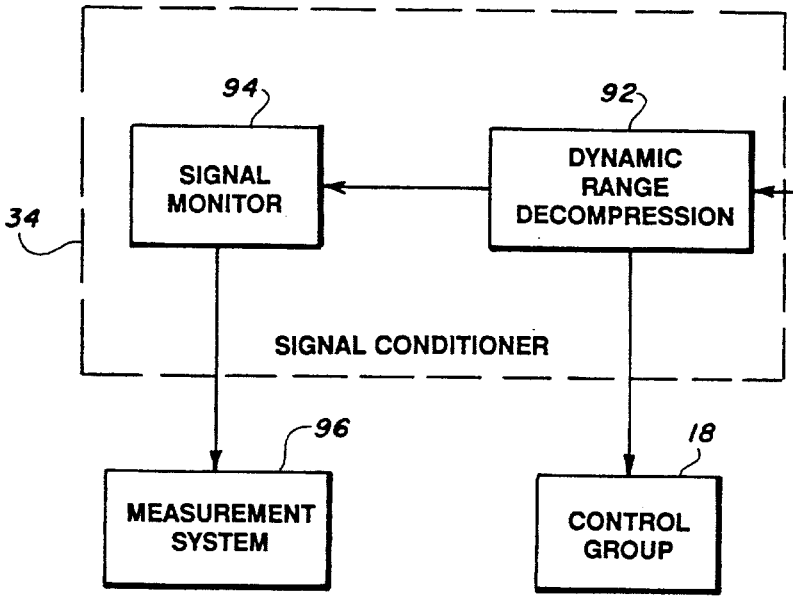
FIG. 5 is a block diagram of a signal conditioner of the hydrophone receiver.

Referring to FIG. 5, the partially recovered audio signal is conditioned in the signal conditioning, or audio processor 34. The dynamic range decompression (DRD) 92 circuitry may be configured to decompress (or expand) the 60 dB range to 120 dB or to operate at a fixed gain with 60 dB dynamic range. Only one configuration is selected at any given time as selected by the microprocessor (not shown) in the control group (not shown). The fully recovered audio signal then passes through a signal monitor 94 and is applied to the front panel output on the control group (not shown). The output is isolated to control noise transients during the absence of an FM carrier or while the receiver (not shown) is acquiring lock. An overload indicator (not shown) on the panel of the control unit (not shown) illuminates when the audio output level is greater than 3 Vrms. This indicator (not shown) is enabled by a control line from the microprocessor (not shown).

The signal conditioning module 34, decompresses the signal from the phase-locked loop 28, if required, by the use of DRD 92. DRD 92 is determined by the polarity of the dc current applied to the preamplifier (not shown). When DRD is required, the microprocessor (not shown) in the control group (not shown) allows the signal conditioning circuit 34 to operate as a dynamic range decompressor. If decompression is not required the DRC 92 operates as a fixed amplifier, the output of which is applied to a front panel jack on the control group (not shown) where the output is available to an operator or measurement system 96. To prevent overloading the system by transients during the turn-on/turn-off and polarity changes during system 10 operation, the microprocessor (not shown) shorts out the audio output signal.

The signal monitor 94 monitors the output of the signal conditioning module 34 for overloads, that is output signal levels greater than 3 Vrms. The signal monitor 34 design is well known to those practicing in the art and is used to activate a warning lamp (not shown) on the control unit 18.

Figure 6:
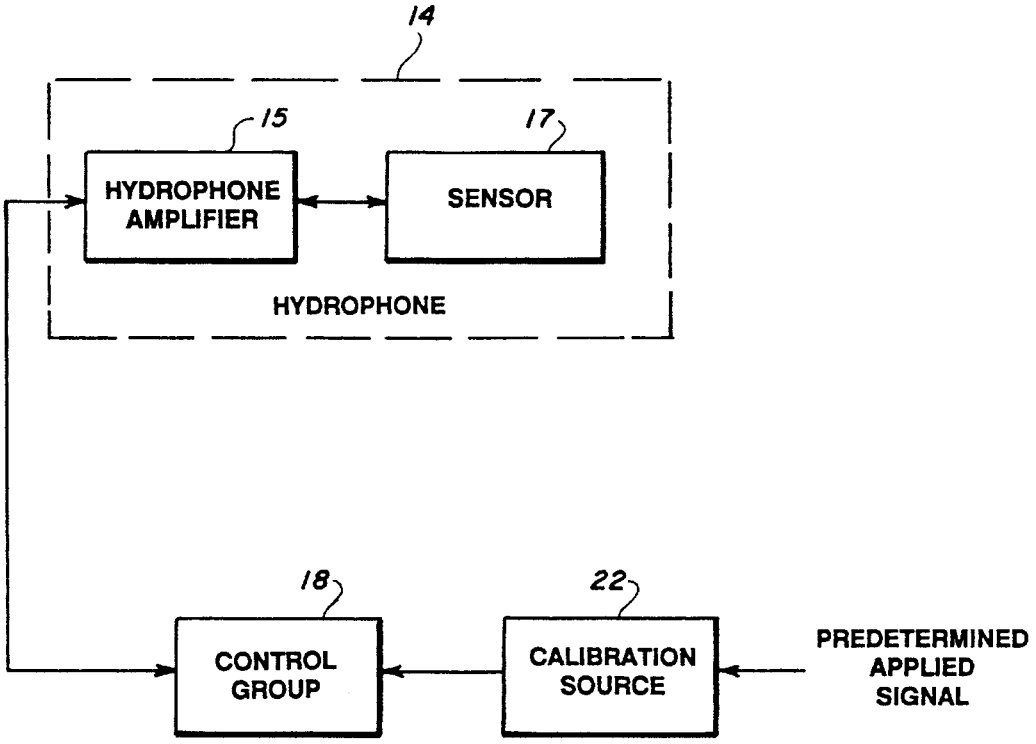
FIG. 6 is a block diagram of a control group.

Also included in the system 10 is a calibration source as shown on FIG. 6, to enable users to test the system prior to deployment. This is accomplished by a calibration current signal being applied to the preamplifier 15 in the hydrophone 14 for the purpose of providing a continuity check of system 10 integrity. The insertion of the calibration signal requires a separate pair of wires to the preamplifier (not shown) and is not intended for use on long cables, i.e., longer than 100 feet. A predetermined signal is applied to the calibration source module 22, processed through circuitry that is well known to those practicing in the art, and output to the preamplifier 15. The operator may then monitor the calibration signal being applied to the preamplifier 15 at the control group 18.

Figure 7:
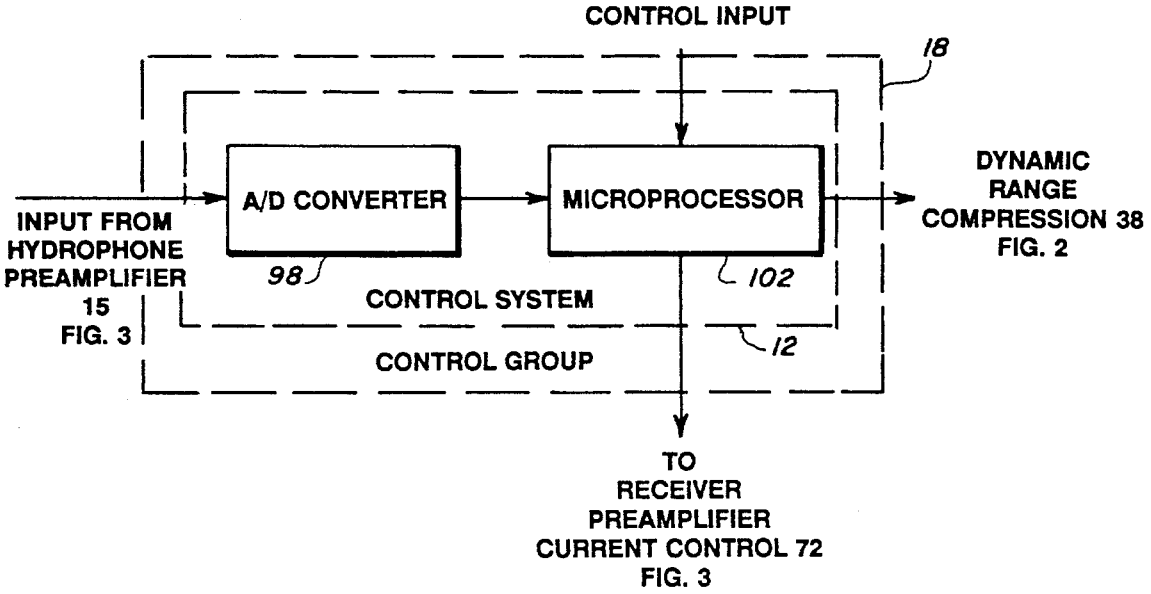
FIG. 7 is a block diagram of a control system of the control group.

The control unit 18, referring to FIG. 7, provides the connections for the output readout devices (not shown), meters for monitoring parameter values (not shown), control switches (not shown) and a control system 12 for controlling the entire system 10. The control system 12 is comprised of an analog-to-digital converter (ADC) 98 and a microprocessor 102, such as part no. D87C51 EXPRESS manufactured by Intel of Santa Clara, Calif. The ADC 98 reads the absolute value of the voltage that appears on coaxial cable to/from the hydrophone preamplifier. This information is periodically read by the microprocessor 102 and used to control the various receiver circuits, as discussed above. The microprocessor 102 also monitors the DRC switch (not shown) and initiates control sequences in response to changes in switch position.

A microprogram in the microprocessor 102 regulates the receiver timing relationship required for start-up or polarity changes. It also checks for error conditions on the preamplifier (not shown) such as an open or short circuit. If an error is detected, the program enters one of several error modes and indicates a problem to the operator. For example, if the preamplifier (not shown) is shown to be open, a "Warning, DRC ON" and a "DRC OFF" indicator (not shown) will blink at one second intervals. If the preamplifier (not shown) indicated that its leads are reversed, the "WARNING" indicator (not shown) flashes at one second intervals. Whatever the error condition, when a problem is corrected, the program returns the receiver (not shown) to normal operation.

The frequency-modulated monitor hydrophone system 10 may be used to measure a broad band of acoustic signals from 10 Hz to 20 kHz at locations separated from the control source up to 6000 meters away. A wide dynamic range and high sensitivity yield very accurate measurements. Only two wires (one coaxial cable) are required to perform the functions of dc power, ac transmission, gain control, and DR. This system is ideally suited for shipboard use when measuring the source level of a projector towed up to 6,000 meters behind the vessel. Monitor hydrophone signals from 10 Hz to 20 kHz can be measured over the range of sound pressure levels from 63 to 227 dB re 2 μPa/V (for a −197 dB sensor). The use of the frequency-modulated carrier by the system 10 allows the reproduction of a sound field at the control unit without contamination by cable-related crosstalk or attenuation. The noise floor of the system 10 is very low, −114 dBV/√Hz.

The calibration circuit source enables the operator to perform a complete system check at any audio frequency level or source level. System performance can be measured by comparing the calibration monitor signal against the hydrophone output signal. Use of the calibration feature requires the addition of two more wires to the preamplifier cable, however.

What is claimed is:

1. A monitor hydrophone system comprised of:

a hydrophone for detecting changes of acoustic pressure in a medium and converting the changes in acoustic pressure into electrical signals;

a means for preamplifying the electrical signals from the hydrophone;

a receiver for receiving the electrical signals and processing them to provide a processed signal;

a means for controlling hydrophone electrical signal and the receiver, and monitoring a plurality of inputs and outputs;

a means for generating a predetermined direct current voltage and current to operate the hydrophone, receiver, and control means;

a means for recording and displaying the processed signal for operation and analysis at a later period; and a means for calibrating the hydrophone to assure continuity.

2. A monitor hydrophone system, as in claim 1, wherein the hydrophone further comprises a sensor and preamplifier wherein the electrical signal is compressed utilizing dynamic range compression and converted into a frequency modulated signal.

3. A monitor hydrophone system, as in claim 2, wherein the receiver is further comprised of means for decompressing the frequency modulated signal, and filtering out noise and out-of-band signals to produce the processed signal.

4. A monitor hydrophone system, as in claim 1, wherein the means for conducting is a coaxial cable having a plurality of conductors for conducting the electrical signal to the receiver, conducting the means for calibrating from the control means to the hydrophone and back to the control means, and conducting system power from the means for generating electrical power to the hydrophone.

5. A monitor hydrophone system, as in claim 1, wherein the hydrophone is further comprised of a means for converting the preamplified electrical signal to an optical signal prior to being applied to the receiver, a means for conducting the optical signal from the preamplifier means to the receiver, and a means in the receiver for converting the optical signal to a second preamplified electrical signal to be processed in the receiver.

6. A monitor hydrophone system, as in claim 5, wherein the means for conducting is a cable having a plurality of fiber optical for conducting an optical signal from the hydrophone to the receiver and for conducting the means for calibrating from the control means to the hydrophone and back to the control means, and a plurality of metallic conductors for conducting system power from the means for generating electrical power to the hydrophone.

* * * * *